3,345,208
FABRICATION OF ELECTROLYTIC CAPACITORS
Hans Keller, Neuhausen am Rheinfall, Switzerland, and Martin Mühlhäusser and Wolfgang Post, Singen, Hohentwiel, Germany, assignors to Aluminium-Walzwerke Singen G.m.b.H., Singen, Hohentwiel, Germany, a company limited of Germany
No Drawing. Filed Aug. 23, 1963, Ser. No. 304,234
Claims priority, application Switzerland, July 24, 1963, 10,091/63
4 Claims. (Cl. 117—200)

This invention relates to a method for the fabrication of solid electrolytic capacitors.

Solid electrolytic capacitors are known comprising a film-forming metal anode, for example made of aluminum, tantalum or niobium, which metal anode is oxidized electrolytically to form a dielectric layer, and is coated with a semiconductive layer of a superoxide and with further layers such as for example graphite and a metal solder to complete the capacitor. The semiconductive layer of a superoxide is produced by coating the oxidized anode with the solution of a metal salt which is capable of being converted into a semiconductive superoxide. For example the oxidized anode is coated with aqueous manganese nitrate which is decomposed by pyrolysis into manganese dioxide. There may be used also lead or nickel salts.

During pyrolysis of the nitrate nitrous and nitric oxides escape which form together with the present water nitrous acid and nitric acid. The dielectric oxide layer is attacked by these acids, on what account in the prior art the oxidation, the coating with the metal salt and the pyrolysis must be repeated several times in order to heal the arising defects in the oxide layer.

In accordance with the present invention the pyrolysis step in the fabrication of the described solid electrolytic capacitors is carried out with an anhydrous salt. Thanks to the absence of water during pyrolysis the attack on the oxide layer is substantially avoided. This results in a lower consumption of current during the end formation of the capacitor, which current is used to heal the damaged oxide layer and is consumed when the capacitor is connected in a film-forming electrolyte to a voltage which is not higher than the forming voltage used for forming the dielectric oxide layer. The dielectric oxide layer is scarcely damaged during pyrolysis of an anhydrous salt, so that it can block a voltage nearly as high as the forming voltage. That means that the finished capacitor reaches a voltage nearly as high as the forming voltage.

In order to make the salt to be decomposed by pyrolysis anhydrous, the water may be removed before coating the anode with the salt or after coating. A salt dehydrated in advance is preferably applied as a solution in an anhydrous solvent, for example by dipping or spraying. It is essential that during pyrolysis no water be present.

Crystallized manganese nitrate contains usually four or more moles of water of crystallization. The dehydration can be carried out by drying the salt at elevated temperature in vacuum in the presence of a drying medium such as phosphorous pentoxide. Thereby the temperature is preferably raised slowly, for example from 50° up to 75° C. and finally up to 95° C. If the salt is heated too fast, it spatters and decomposes easily. The anhydrous manganese nitrate is soluble in ethyl alcohol, isopropyl alcohol and acetone.

*Example 1*

A piece of aluminum foil is oxidized according to the known prior art in order to form the dielectric layer by anodic treatment in a solution of boric acid at a voltage of 100 volts. The oxidized foil is dipped into a solution of 50 g. anhydrous manganese nitrate in 100 cc. anhydrous isopropyl alcohol at a temperature of 70° C. under exclusion of all moisture. For coating with manganese nitrate preferably a concentrated solution is used, what proved to be favorably with regard to the dissipation factor of the capacitor. Most suitable is a saturated solution. As the solubility of the manganese nitrate in the alcohol depends highly on the temperature, the solvent is preferably heated and saturated with the manganese nitrate.

After evaporating the solvent the manganese nitrate which adheres to the oxide layer is decomposed into manganese dioxide by annealing during 10 minutes at a temperature of 400° C.

In this stadium of the fabrication of the capacitor the consumption of current during formation in a film-forming electrolyte at 95 volts has been determined. It reaches a value of 6 mcoul., whereas in a comparison test in which the pyrolysis has been carried out with aqueous manganese nitrate, the current consumption was as high as 700 mcoul. The current consumption during the end formation is much lower if in the fabrication of the solid electrolytic capacitor the pyrolysis is carried out with anhydrous manganese nitrate instead with a water containing salt.

To complete the capacitor the layer of manganese nitrate is coated according to the known prior art with a counter-electrode, for example with graphite, to which is connected the negative lead wire. The positive lead wire is attached to an uncoated spot of the anode.

If the completed capacitor, the anode of which has been formed before pyrolysis at 100 volts, is put at a voltage of 90 volts the leakage current is after a short time very low, whereas a capacitor fabricated with water containing manganese nitrate shows only at a voltage of 70 volts a sufficient low leakage current.

*Example 2*

The aluminum anode oxidized as in Example 1 is impregnated with normal water containing manganese nitrate which is liquid at a temperature above 50° C. The water is removed from the impregnated anode in vacuum in the presence of phosphorus pentoxide. After removing all water the temperature is raised slowly up to 400° C. as in Example 1 in order to decompose the manganese nitrate. The water may be removed at a slightly elevated temperature but which must be beneath the temperature at which the nitrate begins to decompose.

In this example similar values of current consumption and leakage current have been reached as in Example 1.

In the method according to the present invention one coating and pyrolysis is sufficient, whereas according to the prior art oxidation, coating and pyrolysis must be repeated several times without reaching the same good results.

What we claim is:

1. The method for the fabrication of solid electrolyte capacitors by forming a dielectric layer on a film-forming metal anode, coating said dielectric layer with a metal salt which is capable of being decomposed by pyrolysis to form a semiconductive superoxide layer, decomposing said metal salt by heating to form the semiconductive superoxide and coating the semiconductive layer with a layer of a conductive counter-electrode, which method is characterized in that pyrolysis is carried out with anhydrous manganese nitrate.

2. The method according to claim 1, in which the metal anode provided with the dielectric layer is coated with a solution of anhydrous manganese nitrate in an anhydrous solvent and subject to pyrolysis in the absence of water.

3. The method according to claim 1, in which the metal anode provided with the dielectric layer is impregnated with aqueous manganese nitrate in the presence of a drying agent, the water being removed before pyrolysis by a treatment in vacuum at a temperature beneath that temperature at which decomposition of the nitrate begins.

4. The method according to claim 1 in which the metal salt is applied in the anhydrous state dissolved in an anhydrous solvent.

References Cited

FOREIGN PATENTS 241,119  10/1962  Australia.

ALFRED L. LEAVITT, *Primary Examiner.*

WILLIAM L. JARVIS, *Examiner.*

UNITED STATES PATENT OFFICE
CERTIFICATE OF CORRECTION

Patent No. 3,345,208                          October 3, 1967

Hans Keller et al.

It is hereby certified that error appears in the above numbered patent requiring correction and that the said Letters Patent should read as corrected below.

In the heading to the printed specification, lines 10 and 11, for "July 24, 1963, 10,091/63" read -- Aug. 24, 1962, 10,091/62 --; column 2, line 57, for "electrolyte" read -- electrolytic --.

Signed and sealed this 17th day of December 1968.

(SEAL)
Attest:

Edward M. Fletcher, Jr.                          EDWARD J. BRENNER

Attesting Officer                               Commissioner of Patents